United States Patent [19]

Clagett et al.

[11] Patent Number: 5,019,641

[45] Date of Patent: May 28, 1991

[54] POLYAMIDE FROM 1,3 PROPYLENE DIAMINE AND ISOPHTHALIC ACID COMPOUND

[75] Inventors: Donald C. Clagett; Sheldon J. Shafer, both of Pittsfield, Mass.

[73] Assignee: General Electric Company, Pittsfield, Mass.

[21] Appl. No.: 533,969

[22] Filed: Jun. 6, 1990

[51] Int. Cl.$^5$ .............................................. C08G 69/26
[52] U.S. Cl. .................................... 528/347; 528/340
[58] Field of Search ............................... 528/347, 340

[56] References Cited

U.S. PATENT DOCUMENTS 3,382,216 5/1968 Blaschke et al. ...................... 260/78
4,567,249 1/1986 Fox et al. ............................. 528/347

*Primary Examiner*—Harold D. Anderson
*Attorney, Agent, or Firm*—Spencer D. Conard; William F. Mufatti

[57] ABSTRACT

Polyamides obtained by low pressure melt processing involving reactions of diesters of dicarboxylic acids with 1,3-diaminopropane. The polyamides are useful as molding resins.

14 Claims, No Drawings

POLYAMIDE FROM 1,3 PROPYLENE DIAMINE AND ISOPHTHALIC ACID COMPOUND

This invention relates to a low pressure melt process for the preparation of polyamides from a reaction between diesters of dicarboxylic acids and high volatility, low molecular weight diamines; and more particularly, relates to a polyamide and a process for the preparation of the same from diphenyl isophthalate and 1,3-diaminopropane.

BACKGROUND OF THE INVENTION

Polyamides, useful as molding resins and as film and fiber formers, are made commercially by reacting a diacid or diacid precursor with a diamine. In one process a diacid is initially reacted with a diamine in an aqueous media to form a solid polyammonium salt which precipitates from the reaction mixture. The solid is then heated successively in an autoclave reactor under pressure to control explosive initial dehydration and subsequently under reduced pressure to effect conversion of the polyammonium salt to a polyamide. This requires pressurized equipment and careful process control in order to optimize heat and mass transfer. The high melting solid salt which initially cannot be stirred and undergo almost explosive dehydration as the reactor temperature is increased. The solid salt is converted to a mobile liquid which increases in viscosity as additional water is removed as high pressure steam.

Employing these salt processes for the production of polyamides from low molecular weight, highly volatile diamines has encountered some difficulties in the salt preparation from the diamines.

An alternate approach to the use of autoclaves consists of dispersing the polyammonium salts in highly polar solvents and effecting dehydration and solubilization by elevating the temperature of the solution. This process eliminates the need for autoclaves but invokes the use of very special high boiling solvents. The product must ultimately be recovered from solution as a solid. The expensive, high boiling, polar and frequently toxic solvents must be completely removed from the product and be very efficiently recycled to control manufacturing costs.

In still another version, the diacids may be first converted to diacid chloride derivatives which can be reacted in solution or interfacially with diamines at relatively low temperatures to yield polyamides. Very corrosive hydrogen chloride is produced as a by-product of this reaction. The by-product acid must be completely removed from the solution or dispersion of polymer and the polymer must be separated from the reaction solvent.

Additionally, although melt preparation of polyamides from reactions between diesters of dicarboxylic acids and diamines, for example Fox, et. al., U.S. Pat. No. 4,567,249, is known, low pressure melt preparation of polyamides from highly volatile, low molecular weight, diamines such as 1,3-diaminopropane is not known in the art. Accordingly, one object of the present invention is to provide a low pressure melt process for the preparation of polyamides from (a) a diester of dicarboxylic acid and diamine monomers comprising 1,3-diaminopropane.

SUMMARY OF THE INVENTION

According to the present invention, there is provided a low pressure process for the preparation of polyamides by ester-amine interchange between a diester of a dicarboxylic acid and 1,3-diaminopropane. For example the process of the present invention can involve heating a substantially equal mixture of diphenyl isophthalate (DPI) and 1,3-diaminopropane (DAP) to a temperature between the melting point of the DPI and boiling point of the DAP, maintaining said reaction mixture between said temperatures until said DPI and said DAP have reacted to form oligomers, heating said oligomers to a final temperature of at least about 200° C. to increase the ester-amine interchange reaction rate and to obtain high molecular weight polyamides.

Terpolymers can also be formed by admixing DAP with excess DPI, heating the reaction mixture to an initial reaction temperature above the melting point for DPI and below the boiling point for DAP, the reaction mixture forming oligomers of DAP and DPI at said initial reaction temperature, admixing a second diamine, for example hexamethylene diamine (HMDA), thereto, heating said mixture to a higher temperature to increase the reaction rate and form higher molecular weight terpolymers. The total diester and total diamines employed should be in substantially equal mole amounts. Alternatively, the second diamine (HMDA) may be mixed with the DPI and DAP before heating the mixture to said initial reaction temperature, allowing the DAP, DPI and HMDA to react to form oligomers, and then heating the partially reacted mixture to the final reaction temperature.

The present invention relates to a process for the preparation of polyamides from a reaction between diesters of dicarboxylic acids and high volatility, low molecular weight diamines; and more particularly, relates to a polyamide and a process for the preparation of the same from diphenyl isophthalate and 1,3-diaminopropane. The process is preferably run at a pressure of at most about 1 atmosphere.

DETAILED DESCRIPTION OF THE INVENTION

Illustratively, useful diaryl esters of dicarboxylic acids suitable for use in the process of the present invention are diphenolic esters derived from (i) phenolic compounds, e.g., a monohydric phenol, including phenol itself, and alkyl- or halo-substituted phenols, such as o-, m-, and p-cresols, and o- and p-chlorophenol, and the like, and (ii) a dicarboxylic acid, e.g., one having at least 5 carbon atoms, such as the aliphatic diacids like glutaric acid, adipic acid, azeleic acid, 1,12-dodecane dicarboxylic acid, and others, of up to about 30 inclusive carbon atoms and the aromatic diacids, such as phthalic, isophthalic and terephthalic acid. Generally not suitable, because they do not produce melt-processable polyamides, are combinations of diphenolic esters of aromatic dicarboxylic acids with aromatic diamines. A preferred family of diesters are diphenolic esters of terephthalic acid, isophthalic acid, and mixtures thereof. Most preferred is diphenyl isophthalate which has a melting point of about 138° C. to 139° C. and can be represented by the following chemical formula:

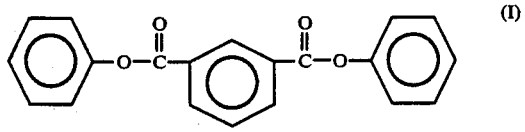

(I)

The diamine employed in the present invention is 1,3-diaminopropane, which has a freezing point of −12° C., a boiling point of 139.7° C., is widely commercially available, is a relatively inexpensive diamine, and can be represented by the following chemical formula:

(II)

The diamine 1,3-diaminopropane has the general advantages of wide availability and relatively low cost when compared to other diamines. Prior processes have had difficulty in utilizing 1,3-diaminopropane as a monomer for the production of polyamides. More particularly, prior processes have been unable to rapidly and easily utilize 1,3-diaminopropane and diphenyl isophthalate to obtain polyamides in low pressure processes.

In general, the process is carried out by charging the reactant into a reaction vessel, heating the reactants to a temperature within a range sufficient to melt the ester but below the boiling point of the 1,3-diaminopropane, maintaining said reaction mixture within the aforementioned temperature range until substantially all of the diaminopropane has reacted with the diphenyl isophthalate. Once the diaminopropane has reacted with the diphenyl isophthalate to form oligomers having substantially higher atmospheric boiling points than 1,3-diaminopropane, then the reaction mixture can be heated to higher reaction temperatures for the purpose of raising the ester-amine interchange reaction rates to obtain high molecular polyamides at low pressures. The initial reaction temperature range is preferably from 135° C. to 145° C. and more preferably 137° C. to 140° C. and most preferably about 138° C. The 1,3-diaminopropane will react with the melted diphenyl isophthalate at temperatures below the boiling point of the 1,3-diaminopropane. Other diamines which boil at higher temperatures than 1,3-diaminopropane, for example, 1,6-hexamethylene diamine, may be added in respective amounts to mixtures of 1,3-diaminopropane and diphenyl isophthalate to obtain a reaction mixture for the formation of various copolymers. These reaction mixtures should initially be heated to a reaction temperature of 135° C. to 145° C., more preferably 137° C. to 140° C. and most preferably 138° C. to permit the 1,3-diaminopropane to react with the diphenyl isophthalate to form oligomers, the reaction mixtures can then be heated to high temperatures to enhance the ester-amine interchange reaction rate and produce relatively high molecular weight polyamides.

Examples of suitable diamines for the purpose of producing the aforementioned copolymers include examples of di-primary amines, particularly useful in the process are those of the general formula $H_2-R-NH_2$ wherein R is divalent straight chain, branched or cyclic alkylene or arylene of such groups optionally interrupted with carbonyl, amino, sulfur-containing groups, and the like, with a total carbon content of the order of 4 to 30 carbon atoms. Illustrative examples are 1,4-tetramethylene diamine, 1,6-hexamethylene diamine, 1,12-diaminododecane, bis(4-aminocyclohexyl)methane, mixtures thereof, and the like. Generally unsuitable are di-primary aromatic diamines, such as m-phenylene diamine and p-phenylene diamine, which have a general tendency to produce polyamides which are so high melting as to be not melt-processable, especially when reacted with isophthalates and terephthalates.

During the aforementioned reaction, amounts of phenolic compounds are generated as byproducts. These phenolic compounds serve as additional sovents for the oligomers and polymers keeping them in one phase with the various reactants and permitting the reaction to continue achieving relatively high molecular weights of polyamide. The phenolic byproducts may be removed as the reaction progresses or after the reaction has neared completion.

The polymers are recovered in conventional ways and they may be molded in any desired shape and are useful as structural and engineering materials to replace metal parts.

The copolymers of the present invention preferably comprise the reaction products of a diamine and a diphenyl isophthalate. The diamine is preferably from 10 to 95 mole percent 1,3-diaminopropane based on the total moles of diamine reacted, more preferrably from 50 to 95 mole percent thereof, and most preferably 90 mole percent thereof; and preferably comprises from 5 to 90 mole percent of said second diamine based on the total moles of diamine, more preferably from 5 to 50 mole percent thereof, and most preferably 10 mole percent thereof. The most preferred second diamine is 1,6-hexanediamine.

DESCRIPTION OF THE PREFERRED EMBODIMENTS

The invention is further described in the examples which follow. These examples are illustrative embodiments of the invention, and are not to be construed in limitation thereof. Polymeric products were thermally characterized by glass transition temperature (Tg). The relative degree of polymerization was estimated by determining intrinsic viscosities in a 40:60 tetrachloroethane:phenol mixture at 30° C. and reported as deciliters/gram.

The polyamides obtained from reaction mixtures of diphenyl isophthalate and 1,3-diaminopropane will have repeating units of the general formula:

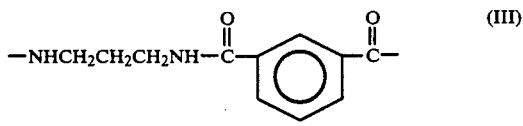

(III)

The reaction to obtain the above identified polyamide can be represented as follows:

(IV)

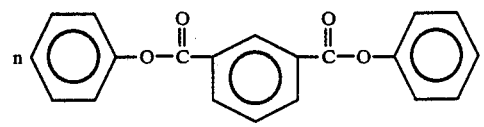

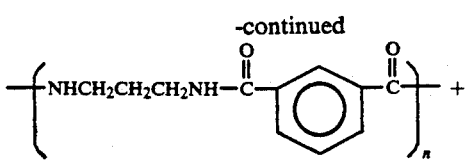

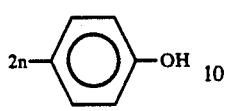

wherein n is preferably selected from between 40 and 400; more preferably from 60 to 250; and most preferably about 75 to 150.

The terpolymers and copolymers obtained by the process of the present invention will have first units of the formula:

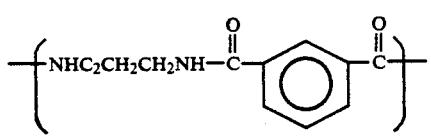 (V)

and second units of the formula:

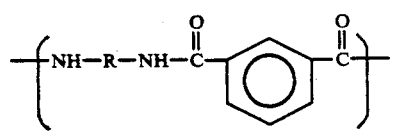 (VI)

wherein R is independently selected from a group consisting of a divalent straight chain, branched or cyclic alkylene or arylene of such groups optionally interrupted with carbonyl, amino, sulfur-containing groups, and the like, with a total carbon content of the order of 4 to 30 carbon atoms. Most preferably R is represented by the formula:

$$—(CH_2)_6—$$ (VII)

Preferably the first units are present in said copolymer at a level of 10 to 95 mole percent based on the total moles of said first and second units in said polymer, more preferably at a level of from 50 to 95 mole percent thereof, and most preferrably 90 mole percent thereof. Preferably said second units are present in the polyamide at a level of from 5 to 90 mole percent based on the total moles of said first and second units, more preferably at a level of 5 to 50 mole percent thereof, and most preferably at a level of 10 mole percent thereof.

In Examples 1 to 5 a polyamide was obtained by reacting a substantially equal mole mixture of (i) a diamine and (ii) a diaryl ester of dicarboxylic acid. The reaction was facilited by heating the reactants under a nitrogen blanket and removing phenol by products as it was produced.

EXAMPLE 1

Initial Reaction Mixture: 152.6 gm Diphenyl Isophthalate (DPI)
36.0 gm 1,3-Diaminopropane (DAP)
(1% molar excess of DAP)

| Time (min) | Temp. (°C.) | Pressure (atm) | Phenol Removed (ml) | Comments |
|---|---|---|---|---|
| 0 | 135 | 1.0 | | |
| 25 | 136 | 1.0 | | |
| 33 | 147 | 1.0 | | |
| 45 | 172 | 1.0 | | |
| 51 | 181 | 1.0 | | |
| 60 | 187 | 1.0 | | |
| 70 | 188 | 1.0 | | Started to remove phenol |
| 85 | 189 | Started Vacuum | 5 | |
| 95 | 190 | | 8 | |
| 117 | | | 26 | |
| 128 | | — | 36 | |
| 137 | | | 42 | |
| 145 | | | | Stopped |

I.V. = 0.23
Tg = 160° C.

EXAMPLE 2

Initial Reaction Mixture: 26.44 g Hexamethylene diamine (HMDA)
1.85 g 1,3-Diaminopropane (DAP)
79.60 g Diphenyl isophthalate (DPI)

| Time (min) | Temp. (°C.) | Pressure (atm) | Removed (ml) | Comments |
|---|---|---|---|---|
| 0 | 138 | 1.0 | | Stirred |
| 40 | 135 | 1.0 | | Stirred |
| 65 | 140 | 1.0 | | Stirring Stopped |
| 70 | 157 | 1.0 | | |
| 90 | 174 | 1.0 | | |
| 110 | 220 | 1.0 | | |
| 130 | 250 | Started Vacuum | 10 | Stopped |

Resulting polyamide had an intrinsic viscosity of 1.278 dl/g and a Tg of 115° C.

EXAMPLE 3

Initial Reaction Mixture: 23.53 g HMDA
3.71 g DAP
79.60 g DPI

| Time (min) | Temp. (°C.) | Pressure (atm) | Removed (ml) | Comments |
|---|---|---|---|---|
| 0 | 140 | 1.0 | | Stirred |
| 30 | 140 | 1.0 | | Stirring Stopped |
| 65 | 220 | 1.0 | | |
| 80 | 250 | 1.0 | | |
| 85 | 250 | Started Vacuum | 18 | |

I.V. = 1.149
Tg = 122° C.

EXAMPLE 4

Initial Reaction Mixture: 20.63 g HMDA
5.56 g DAP
79.60 g DPI

| Time (min) | Temp. (°C.) | Pressure (atm) | Removed (ml) | Comments |
|---|---|---|---|---|
| 0 | 30 | 1.0 | | |
| 20 | 144 | 1.0 | | Refluxed Vapors |
| 80 | 140 | 1.0 | | |
| 95 | 194 | 1.0 | | |
| 115 | 200 | 1.0 | | |
| 140 | 220 | 1.0 | | |
| 160 | 230 | 1.0 | | |
| 185 | 250 | Started Vacuum | 8 | |
| 205 | 250 | | 34 | |

I.V. = 0.876
Tg = 135° C.

EXAMPLE 5

Initial Reaction Mixture: 17.72 g HMDA
7.41 g DAP
79.60 g DPI

| Time (min) | Temp. (°C.) | Pressure (atm) | Removed (ml) | Comments |
|---|---|---|---|---|
| 0 | 142 | 1.0 | | Stirring |
| 60 | 144 | 1.0 | | |
| 90 | 200 | 1.0 | | |
| 115 | 220 | 1.0 | | |
| 135 | 250 | Started Vacuum | 20 | |
| 150 | 250 | | 34 | Stirring Stopped |

I.V. = 0.814
Tg = 135° C.

The foregoing detailed description will suggest many variations to those skilled in the art. All such variations are within the full scope of the appended claims.

In Example 6, an equimolar mixture of DAP and HMDA was reacted with DPI. Initially 955.09 grams of DPI were charged to the reaction vessel under a nitrogen blanket and heated. Once the DPI was melted, 111.29 grams of DAP were charged to the reaction vessel and the temperature of the reaction vessel was then raised. The vent on the reaction vessel was then opened and 177.89 grams of HMDA were rapidly charged to the reaction vessel and the vent was closed briefly to prevent any HMDA from escaping. The temperature was then raised and the pressure was slowly reduced, while removing phenol. The resulting copolymers had an intrinsic viscosity of 0.853 deciliters per gram.

EXAMPLE 6

Initial Reaction Mixture: 955.09 gm Diphenyl Isophthalate (DPI)
177.89 gm Hexamethylenediamine (HMDA)
111.29 gm Diamine propane (DAP)

| Time (min) | Temp. (°C.) | Pressure (atm) | Comments |
|---|---|---|---|
| 0 | | ≈1.0 | Reactor Charged |
| 50 | 145.6 | ≈1.0 | |
| 60 | 134.5 | ≈1.0 | |
| 70 | 135.6 | ≈1.0 | |
| 95 | 139.2 | ≈1.0 | |
| 97 | 149.2 | ≈1.0 | Close Vent |
| 110 | 179.1 | ≈1.0 | |
| 155 | 188.3 | ≈1.0 | Open Vent |
| 200 | 205.1 | ≈1.0 | |
| 215 | 218.0 | 0.83 | Started vacuum |
| 220 | 220.0 | 0.67 | |
| 225 | 219.1 | 0.50 | |
| 230 | 217.6 | 0.33 | |
| 245 | 249.2 | 0.16 | |
| 250 | 251.0 | 0.07 | |
| 260 | 266.5 | $2.1 \times 10^{-3}$ | |
| 265 | 267.0 | $1.5 \times 10^{-3}$ | |
| 270 | 267.4 | $1.2 \times 10^{-3}$ | |
| 275 | 267.0 | $1.1 \times 10^{-3}$ | |
| 280 | 267.6 | $1.0 \times 10^{-3}$ | |
| 285 | 269.9 | $0.9 \times 10^{-3}$ | |

I.V. = 0.853 deciliters/gram
Tg = 141

What is claimed:

1. A process for the preparation of a polyamide by reacting at least one diaryl ester of a dicarboxylic acid with a diamine component said process comprising:
   (a) preparing a mixture of (i) at least one diaryl ester of a dicarboxylic acid having at least 6 carbon atoms and a diamine component, said diamine component including an amount of 1,3-diaminopropane, said ester having a melting point below about 145° C.;
   (b) heating said mixture to an initial reaction temperature above the melting point of said diarylester and below the boiling point of said 1,3-diaminopropane for reacting said 1,3-diaminopropane with said ester to form oligomers;
   (c) heating said mixture to a final reaction temperature above 145° C.

2. A process according to claim 1, wherein said diester of the dicarboxylic acid is diphenyl isophthalate.

3. A process according to claim 2, wherein said diamine component further includes amounts of 1,6 hexamethylene diamine.

4. A process according to claim 1, wherein said initial temperature is between about 135° C. and about 145° C.

5. A process according to claim 4, wherein said initial temperature is between about 137° C. and 140° C.

6. A process according to claim 5, wherein said initial temperature is about 138° C.

7. A process according to claim 4, wherein said diamine component consists essentially of 1,3-diaminopropane and 1,6 hexamethylenediamine.

8. A process according to claim 1 wherein said diamine component consists essentially of 1,3-diaminopropane.

9. A process according to claim 1 wherein said final temperature is above about 200° C.

10. A process for the preparation of a polyamide, said process consisting of preparing a mixture consisting essentially of 1,3-diaminopropane, 1,6 hexamethylene diamine, and diphenyl isophthalate; heating said mixture to an initial reaction temperature selected from a temperature range of about 135° C. to about 145° C., maintaining said mixture at said initial reaction temperature until substantially all of said 1,3-diaminopropane is reacted with said diphenyl isophthalate, heating said mixture to a final reaction temperature of at least about 200° C.

11. A copolyamide having a weight average molecular weight of at least 17,000 and comprising at least 50 percent by weight units of the general formula:

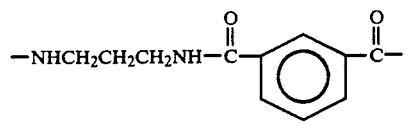

12. A copolymer derived from 1,6 hexamethylenediamine, 1,3-diaminopropane, and diphenyl isophthalate.

13. A copolymer consisting essentially of first units of the formula:

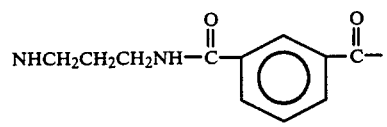

and second units of the formula

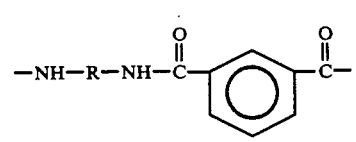

where R is independently selected from a group consisting of a divalent straight chain, a divalent branched alkylene, a divalent cyclic alkylene, a divalent arylene, said R having a total carbon content of the order of 4 to 30 carbon atoms; wherein said first units are present at a level of from 50 to 99 percent by weight based on the total weight of the polymer, and said second units are present at a level of from 1 to 50 percent by weight based on the total weight of the polymer.

14. The copolymer of claim 13 wherein said R is represented by the formula:

$$-(CH_2)_6-.$$

* * * * *